(12) United States Patent
Halahmi

(10) Patent No.: US 11,035,667 B2
(45) Date of Patent: Jun. 15, 2021

(54) MONITORING SYSTEM AND METHOD FOR CONTROLLING PROCESS OF SURFACE TREATMENT FOR CONSTRUCTION

(71) Applicant: Erez Halahmi, Givat Yearim (IL)

(72) Inventor: Erez Halahmi, Givat Yearim (IL)

( * ) Notice: Subject to any disclaimer, the term of this patent is extended or adjusted under 35 U.S.C. 154(b) by 64 days.

(21) Appl. No.: 16/330,086

(22) PCT Filed: Sep. 13, 2017

(86) PCT No.: PCT/IL2017/051035
§ 371 (c)(1),
(2) Date: Mar. 3, 2019

(87) PCT Pub. No.: WO2018/051341
PCT Pub. Date: Mar. 22, 2018

(65) Prior Publication Data
US 2019/0212140 A1    Jul. 11, 2019

Related U.S. Application Data

(60) Provisional application No. 62/394,237, filed on Sep. 14, 2016.

(51) Int. Cl.
*G01B 21/20* (2006.01)
*E04F 21/08* (2006.01)
*G01B 11/24* (2006.01)
*G01B 15/04* (2006.01)
*G08B 5/22* (2006.01)
*E04F 13/02* (2006.01)
*E04F 21/02* (2006.01)

(52) U.S. Cl.
CPC .............. *G01B 21/20* (2013.01); *E04F 21/08* (2013.01); *G01B 11/24* (2013.01); *G01B 15/04* (2013.01); *G08B 5/22* (2013.01); *E04F 13/02* (2013.01); *E04F 21/02* (2013.01)

(58) Field of Classification Search
CPC ........ G01B 21/20; G01B 11/24; G01B 15/04; E04F 21/08; E04F 13/02; E04F 21/02; G08B 5/22
See application file for complete search history.

(56) References Cited

U.S. PATENT DOCUMENTS 10,606,340 B2 * 3/2020 Reddish ..................... G06F 3/00
2003/0003847 A1 * 1/2003 Yi ........................... B24B 41/04
451/9

(Continued)

*Primary Examiner* — Thomas C Lee
*Assistant Examiner* — Anzuman Sharmin

(57) ABSTRACT

A monitoring method and system are present for process control of surface treatment associated with material deposition on the surface, which provides for achieving and maintaining a desired (according to design rules) geometrical profile of the surface while being coated by certain substance/material. The technique of the invention provides for remotely and fully-automatically monitoring/verifying the geometrical profile of the surface being treated, and providing the control/verification data for executing local corrections. The technique can be applied to various geometrical profiles such as planar geometry, round/curved surface of a predetermined curvature, multi-portions surface with predetermined angular orientations of the multiple portions (e.g. 90 degree angles at corners of a room).

13 Claims, 10 Drawing Sheets

(56) References Cited

U.S. PATENT DOCUMENTS

| | | | |
|---|---|---|---|
| 2012/0219699 A1* | 8/2012 | Pettersson | B05B 12/124 |
| | | | 427/8 |
| 2016/0121486 A1 | 5/2016 | Lipinski et al. | |
| 2017/0228108 A1* | 8/2017 | Marsolek | G06F 3/04847 |
| 2018/0283019 A1* | 10/2018 | Telleria | B05D 3/0413 |

* cited by examiner

| | Without the system | With the system | Saving |
|---|---|---|---|
| Work duration | 64 min (35 min plastering + 30 min corrections) | 25 min Single phase | 61% |
| Material amount | 9 buckets | 7 buckets | 22% |
| Precision of results | Very low | Very high | |

MONITORING SYSTEM AND METHOD FOR CONTROLLING PROCESS OF SURFACE TREATMENT FOR CONSTRUCTION

TECHNOLOGICAL FIELD

The invention is generally in the field of process control techniques, and relates to a monitoring system and method for controlling a process of surface treatment. The invention is particularly useful for controlling a process of coating a surface with certain material, such as cement plastering used in building industry.

BACKGROUND

Construction is a major expense in anyone's budget (a country, a person, a company etc.). Customers always are looking for the best result for the lowest cost. One of the important phases in construction in the finish, mainly because the results of finish are directly exposed to viewers. The finish stage includes plastering and painting. A wall that is not smooth enough (planar wall or round wall) or a corner that is not 90 degree stand out. Non-uniform (non-smooth) wall is typically undesired in construction and may cause a lot of distress to the customer. In order to achieve best results professionals use specific rulers.

Plastering is required in almost all industrial, commercial, residential and public buildings. The sector encompasses specialist contractors that install plasterboard and ornamental plastering products, finish and render walls and apply solid or fibrous plastering.

In the traditional plastering process, a worker uses a leveler and periodically performs the manual verification-and-correction procedure. This is a very time consuming and material waste process, which is thus too costly.

Various techniques have been developed to improve the plastering process. These techniques are actually aimed at modifying/improving the construction and operation of a leveler.

CN204086076 discloses a ruler mortar consistometer having a base, a slide rod installed on the base, a mortar accommodating barrel placed on the base, a test cone and a spacing supporting frame installed on the slide rod and being adjustable in height. One end of the spacing supporting frame is fixedly provided with a main ruler, which is internally provided with an auxiliary ruler. The lower end of the auxiliary ruler is connected with the test cone, and the auxiliary ruler can slide freely in the main ruler and can be fixed by a screw.

CN103572956 discloses a wall plastering machine which comprises a cement mortar transport vehicle. The cement mortar transport vehicle is provided with a mixing tank configured with a stirring device and with a cement mortar pressurized conveying device. The latter has a conveying pipe connected with the mixing tank and a hopper respectively. A cloth port is formed in the lower end of the hopper, and the hopper has a vibration device. The wall plastering machine is arranged on two stand columns provided with gear racks and penetrating through the wall plastering machine. The gears are configured on the wall plastering machine to be matched with the gear racks on the stand columns and are configured with a gear drive motor. The lower ends of the stand columns are fixed on a chassis, and the upper ends of the stand columns are propped against a top plate. A wall plastering framework is lower than the outer end part of a conveying belt, and a storage area is formed in the dropping position. Baffles are arranged on two sides of the wall plastering framework, telescopic floating rulers are arranged above and below the plastering position of the wall plastering machine and configured with telescopic devices, and the upper floating ruler extends out to downwards and secondarily level the wall after the wall plastering machine finishes plastering the top of the wall.

CN103572774 discloses a leveling ruler underboarding mortar bedding method. The method comprises the steps: (a) mounting adjusting bolts on a concrete foundation and mounting the flat underboarding onto the adjusting bolts; (b) mounting adjusting bolts at both ends of the concrete foundation and arranging two temporary supports on the adjusting bolts; (c) adjusting the temporary supports to be level according to actual elevation requirements; (d) placing a leveling ruler with a frame-type level gauge at the upper portion onto the two temporary supports and adjusting the temporary supports according to the readings of the frame-type level gauge; (e) adjusting the levelness of the flat underboarding, and based on the leveling ruler, examining the gap between the flat underboarding and the leveling ruler through a feeler to enable the gap between the flat underboarding and the leveling ruler to be uniform; (f) removing the leveling ruler and the temporary supports and performing molding and grouting.

CN101812919 describes a multi-directional wall surface plastering machine which comprises a chassis provided with travelling wheels. A control device is installed on the chassis, and an upper support rail frame is installed on a chassis rail frame of the chassis through a connecting shackle; a working rail frame driven by a travel driving device is installed on a rail comprising the upper support rail frame and the chassis rail frame on the chassis, and the working rail frame comprises a vertical displacement rail and a horizontal displacement rail; a coating leveler is installed on the horizontal displacement rail; and a laser closed loop feedback positioning system is installed on the working rail frame and the coating leveler; and the travel driving device and the laser closed loop feedback positioning system are connected with the control device. The multi-directional wall surface plastering machine provided by the invention mechanizes the whole process of plastering procedures, completely substitutes for manual plastering, has high evenness, and quickens the construction efficiency.

GENERAL DESCRIPTION

There is a need in the art for a novel approach of controlling the process of surface treatment associated with material deposition on the surface.

The present invention provides a novel method and system for such process control, which provides for maintaining a desired (according to design rules) geometrical profile of the surface while being coated by certain substance/material. The technique of the invention provides for remotely and fully-automatically monitoring/verifying the geometrical profile of the surface being treated, and providing the control/verification data for executing local corrections.

The technique of the invention can be used for controlling the treatment process (including material deposition) of the surface of any desired geometrical profile, including but not limited to planar geometry, round/curved surface of a pre-determined curvature, multi-portions surface with predetermined angular orientations of the multiple portion (e.g. 90 degree angles at corners of a room). The invention provides for concurrently monitoring processing of multiple walls.

In this connection, it should be understood that the existing techniques of the process of the kind specified, e.g. those used in the finish stage of construction, suffer from a need to repeatedly perform a manual verification-and-correction procedure (to achieve leveled straight/smooth walls) a lot of preparations from the professional. Moreover, it appears that the accuracy in the surface smoothness that such known techniques can provide is for best undescribed and for worst unsatisfactory.

For the purposes of the present application, the term "surface" should interpreted broadly relating to any outer face, outside, or exterior boundary of a thing, being either continuous or formed by separate portions. Also, the term "geometrical profile" should be understood as describing a profile/topography (feature's form and/or size and/or orientation, and possibly also location) of any shape and relative arrangement of the parts of a surface. The desired geometrical profile of a surface may thus relate to a desired degree of smoothness/uniformity/flatness of a surface and/or a desired surface pattern (e.g. spaced-apart protrusions) of a surface, for the surface of any desired geometry/shape (straight/planar, curved, polygonal, etc.). It should be understood that a surface formed by right-angle orientation of two surface portions is an example of polygonal geometry/shape. Further, it should be noted that the expression "surface treatment including material deposition process" should also be interpreted broadly relating to construction processes including plastering, ceiling, as well as creation any desired 2D or 3D construction/pattern according to predetermined design rules. With regard to the feedback/control data, it should be understood that such data may be stored/recorded for further analysis/verification and/or controlling the correction procedure.

Thus, the technique of the present invention, in some embodiments, provides for controlling/monitoring the material deposition (coating) process applied to a surface to result in the coated surface having desired geometrical profile. The technique of the invention is easy to use with which the professional can produce a uniform leveled wall as well as accurate corners after coating with plaster, mortar, or any other coating.

It should also be understood that the technique of the invention eliminates a need for any additional mechanical equipment, except for that required for the surface coating process. Such additional equipment used in the known technique is that associated with periodic physical measurements/verification of the surface geometry.

In some embodiments, the technique of the present invention deals with measuring the flatness of a wall undergoing plastering process (constituting process of surface treatment including material deposition) and providing feedback in the form of direct indication (visual and or audio feedback) to the professional covering the wall, with for example cement plaster. The so-provided feedback may result in significant reduction of the amount of filling material (e.g. plaster) used and/or in optimization of the amount of filling material used in the process, as well as reduction of the amount of work involved in the plastering process, by significantly reducing the correction procedures. In some embodiment, the system of the invention also controls a minimum thickness of the coating being applied, based on user input to the system.

Thus, the present invention, according to one broad aspect, provides a monitoring system for monitoring a process of surface treatment including material deposition process applied to the surface to create a coating of said material on the surface, the system comprising a control unit comprising:

data input utility configured to receive measured data indicative of a measured geometrical profile of the surface undergoing said treatment; and data processor and analyzer utility configured to analyze said measured data and determine a relative profile of said surface indicative of distribution of variations of the measured geometrical profile with respect to a design profile of said surface, and utilize said data indicative of the relative profile to generate control data indicative thereof; and a feedback module configured to receive said control data and generate feedback data formatted to be indicative of regions of the surface that are to undergo at least one of the additional material deposition process and a material removal process to maintain said design profile of the surface while being coated by said material.

The measured data is received by a data provider, which may be a storage device (a so-called off-line mode of system operation) or a measurement device itself (a so-called on-line or real time mode of the monitoring technique).

The data processor and analyzer includes software modules and may for example be installed in a personal communication device, such as a mobile phone device. The measurement device may utilize an imager (one or more cameras) typically installed in the personal communication device for applying measurements to the surface being processed and produce the measured data.

The measured geometrical profile may comprise three-dimensional geometrical data about the surface being treated. As for the desired profile data it may comprise two- or three-dimensional geometrical data about the surface.

In some embodiments, the measured data indicative of the measured geometrical profile of the surface comprises relative distance data comprising a distance profile for different regions of the surface from a measurement location.

The feedback module may be configured and operable for generating the feedback data formatted to provide control data for a surface treatment entity for automatic execution of the material deposition and removal processes; and/or formatted to provide control data for guiding manual execution of the material deposition and removal processes during the surface treatment.

In some embodiments, the feedback module comprises a projector device configured and operable for projecting an image indicative of the control data on the surface being treated. The image may comprise visual representation of the distribution of variations of the measured profile with respect to the desired profile within the surface, thereby providing a direct visual information distinguishing the regions that are to undergo the additional material deposition process and the material removal process. For example, the visual representation is a colored representation of the distribution of variations of the measured profile with respect to the desired profile within said surface, such that the regions that are to undergo the additional material deposition process and the regions that are to undergo the material removal process are identified by different colors.

As described above, the processor may be a part of or in data communication with a storage device which receives and stores the measured data generated by a measurement device. In another example, the data processor may be configured to be a part of or to be in data communication with the measurement device. In yet another example, the software modules of the data processor are distributed between the measurement device and a stand-alone control unit.

In some embodiments, the control unit is configured and operable for continuously or periodically receiving and processing the measured data in real time during the treatment processing of the surface, and responding by providing the feedback data indicative of the control data for each region of the surface.

The measurement device may be configured for optical measurements, and may comprise at least one imager for providing measured data indicative of the geometrical profile of the surface. Generally, the suitable measurement techniques may include one or more of the following: Time Of Flight (TOF) measurements, acoustic measurements, Optical Coherence Tomography (OCT), stereoscopic measurements, and structured light 3D scanning.

As also described above, the desired profile data may be provided by or in accordance with user input and may include one or more of the following: a degree of smoothness of the surface; a relative angular orientation of different portions of the surface; a surface pattern. To this end, the monitoring system includes a user interface configured for receiving user data. The user data may further comprise data indicative of a minimum thickness of the coating on the surface to be obtained as a result of said treatment.

The invention thus also provides a personal communication device comprising the above described monitoring system.

In yet further aspect, the invention provides a monitoring system for real time monitoring a process of surface treatment including a material deposition process being applied to a given surface, the system comprising a control unit comprising:

a measurement device configured and operable for continuously or periodically applying measurements to said surface and generating measured data indicative of a measured geometrical profile of the surface undergoing said treatment;

a control unit configured and operable to receive and analyze the measured data and determine a relative profile of said surface indicative of distribution of variations of the measured geometrical profile with respect to a design profile of said surface, and utilize said data indicative of the relative profile to generate control data indicative thereof, the desired profile corresponding to at least one of a desired smoothness of the surface, and a desired relative angular orientation of different portions of the surface; and a feedback module configured to receive said control data and generate feedback data providing visual representation of the distribution of variations of the measured profile with respect to the desired profile within said surface, thereby providing a direct visual information distinguishing regions that are to undergo additional material deposition process and material removal process to maintain said design profile of the surface while being coated by said material.

The present invention is particularly useful for managing such construction process as plastering/coating and is therefore described and exemplified below with respect to this specific application. However, as noted above, the principles of the invention enabling process control by monitoring the process and providing control data (for guiding corrections and/or verification) are not limited to this specific application.

Thus, in a specific but not limiting example, the system measures the topography of the wall and or walls and or ceiling, analyses it according to the input of the user and provides output to the user of how to apply the filling material for optimal results. For example, a Time Of Flight (TOF) camera (like Kinect V2) is used to get a 3D model of the room. Then, an algorithm calculates how much plaster is needed in each region in order to achieve the requirements (level of flatness, degrees in corners, minimum thickness of coating, etc.). Then, the output (control data) is provided to the user, for example in the means of a projector that provides a color codes like in topographic maps. For example, red means the user needs to fill more plaster, blue means the user needs to remove plaster and green means the amount is accurate. This process of getting the current state of the wall and providing feedback to the user is ongoing for the entire duration of the work. This way the user knows at each moment where the user needs to add or remove plaster in order to achieve a uniform leveled wall with the desired degrees in the corners. The feedback to the user may be audio signal advising the user if to apply more or less filling material based on his hand's location. The feedback may be also a combination of the two (audio and visual). The feedback may also be used for the sole purpose of evaluating the flatness and or levelness of existing wall or walls. Is it important to note that plaster is given as a non-limiting example. Cement plaster, cement, mortar and similar can also be used, as well as mixture of them.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 3A illustrates the walls before they are covered/coated, FIG. 3B illustrates the walls after they are covered and achieving 90 degrees between them, and FIG. 3C illustrates the walls after they are covered and achieving 90 degrees between them in an non-optimized manner;

DETAILED DESCRIPTION OF EMBODIMENTS

Figure 1:
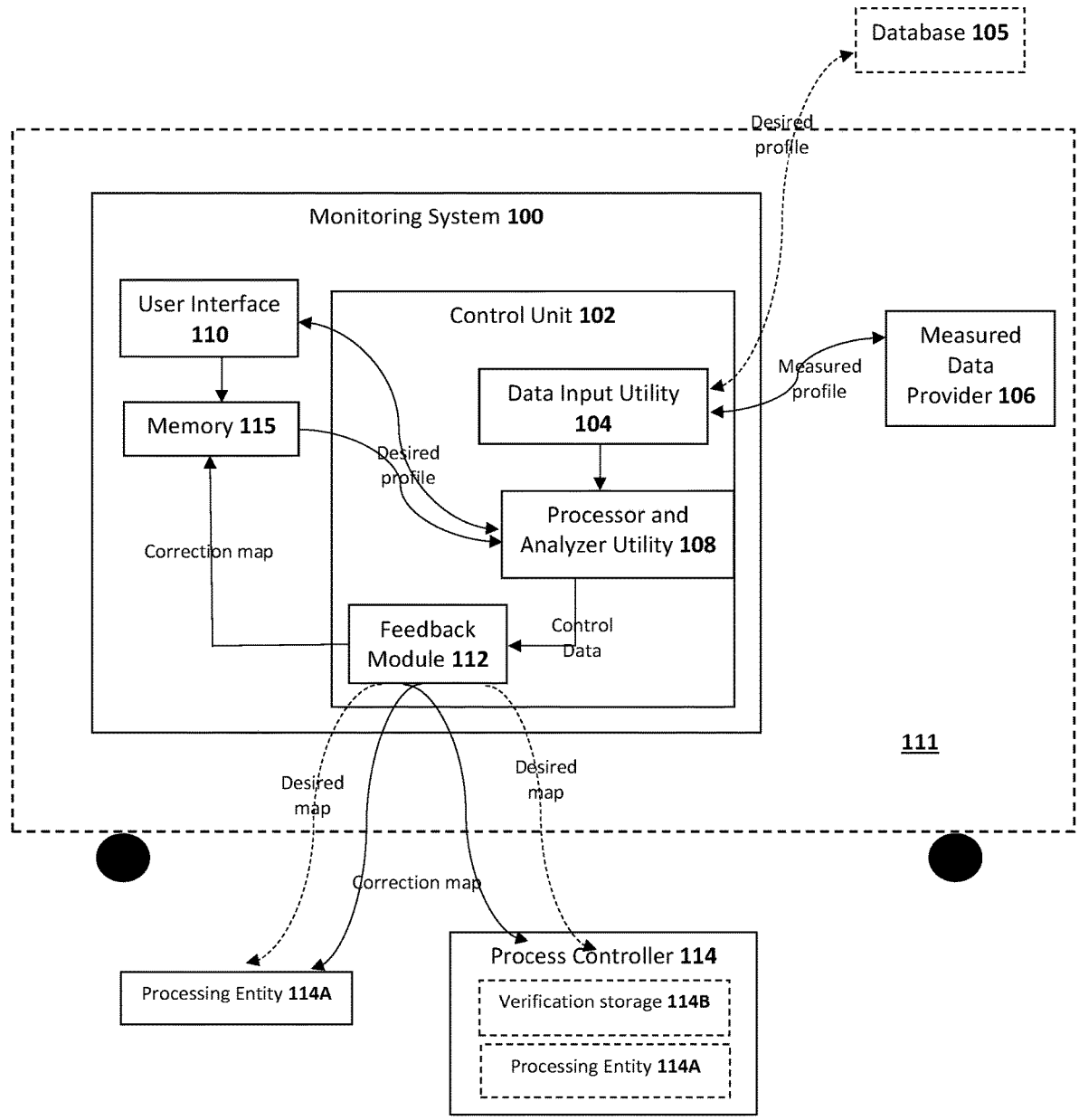
FIG. 1 illustrates a block diagram of a system of the invention for monitoring a process of surface treatment including material deposition process applied to the surface.

Referring to FIG. 1, there is illustrated, by way of a block diagram, a monitoring system 100 of the present invention. The monitoring system 100 is configured for monitoring a process of surface treatment including material deposition process. As indicated above, the present invention is exemplified here as being used for controlling the wall coating process of construction, such as plastering or flooring.

The monitoring system 100 is associated with a measured data provider utility 106, for receiving therefrom input measured data indicative of measured geometrical profile of the surface undergoing the coating process. This measured geometrical data may be indicative of a three-dimensional or two-dimensional surface profile, i.e. a 2D or 3D coordinate function (map/distribution) of a certain surface-related parameter within the surface being treated.

The measured data provider 106 may be an external storage device in which such measured data has been previously received from a measurement device and stored for further use. Alternatively, the measured data provider may be a measurement device itself. For example, the monitoring system 100 may be part of the measurement device. The measurement device 106 may be configured for implementing one or more measurement techniques of any known suitable type for measuring the shape/geometry of a surface, and possibly also measuring a thickness of a coating being deposited on the surface. For example, the suitable measurement techniques may include one or more of the following: a distance measurement technique, such as a range finding technique (e.g. optical technique), and/or time-of-flight (TOF) based optical or RF technique, acoustic-based measurement technique, and/or stereoscopic imaging technique; a curvature/shape measurement technique (e.g. utilizing illumination by structured light); and/or a depth measurement technique (e.g. Optical Coherent Tomography (OCT)).

Considering for example the use of a range finding technique (that measures distance from a measurement location to a target), the measurement device includes at least one imager, e.g. rangefinder camera fitted with a rangefinder (typically a split-image rangefinder); or a laser rangefinder which uses a laser beam to determine the distance to an object. The most common form of laser rangefinder operates on the time of flight principle by sending a laser pulse in a narrow beam towards the object and measuring the time taken by the pulse to be reflected off the target and returned to the sender. Considering the construction application described above, where the millimeter range accuracy is sufficient, the laser rangefinder is suitable. It should also be understood that the measurement device or at least a measurement unit thereof may be configured for scanning the surface under treatment. A 3D scanner may be used with TOF based laser unit assembled on a scanning motor assembly, a TOF camera, an assisted stereo or a structured light device, or a combination thereof (e.g. one for short range and one for long range). All of the above may be positioned on manual or motorized 1D or 2D or 3D gimbal or tripod.

Thus, generally speaking, the monitoring system 100 is configured to be in data communication (via wires or wireless signal transmission) with the measured data provider 106 to receive the measured geometrical data about the surface obtained by any suitable measurement technique.

Further, the monitoring system is associated with (i.e. is in data communication) a treatment process controller 114. Such process controller may be constituted by a processing entity 114A being either an automatic processing system or an individual who is involved in a manual or semi-automatic treatment process. Alternatively or additionally, the process controller may be associated with a storage/verification system 114B.

The monitoring system 100 is typically a computer system including inter alia a memory utility 115 and control unit/utility 102 which is configured and operable according to the invention and includes a data input utility 104, a data processor and analyzer 108, and a feedback module 112. Also optionally provided in the monitoring system 100 is a user interface utility 110.

The user interface utility 110 serves for user input of data, including data indicative of a desired profile of the treated surface to be obtained. Such data indicative of the desired profile may be in the form a two- or three-dimensional geometrical data about the surface. In other words, the desired profile is a 2D or 3D function/map of the distribution of one or more geometrical parameters of the surface within the surface. Such geometrical data may define a degree of planarity and/or smoothness of the surface; a surface curvature profile; a relative angular orientation of two or more portions of the surface. In some instances, the desired profile can be a right-angle profile of two portions of the surface, for example two walls normal to each other with a joint corner. In some other examples, the desired geometrical profile may alternatively or additionally be indicative of a predetermined geometrical pattern on the surface (surface relief) or spaced-apart from the surface at a certain relation thereto. An example of the latter case is the use of the technique of the invention during the preliminary stages of building for marking where to put walls or how to put blocks or bricks straight.

Also, user input via the interface 110 may include data related to the coating to be obtained. This may for example be a certain minimum thickness of the coating on the surface, or a desired profile of the coating thickness variations, as the case may be.

It should be noted that the provision of the user interface is optional. This is because, generally, the monitoring system 100 can be configured to be installed with a default desired profile, e.g. planar geometry having a default parameters; or configured to receive such data to the data input utility 104 from a remote database 105 (e.g. via the communication network). It should be noted that such database may store data indicative of geometrical profiles for various constructions, e.g. according to standards.

Thus, data indicative of the desired profile of the surface to be obtained as a result of the surface treatment (and possibly also the coating-related data) is received by the system 100, and may be stored in the memory 115.

During the operation of system 100, the measured profile data is received from the data provider 106. Considering on-line or real-time operational mode of the system 100, such measured data may be received continuously during the coating procedure or periodically with a certain predefined (controllable) time pattern (a so-called sampling pattern).

The data processor and analyzer 108 of the control unit 102 is configured and operable to analyze the measured geometrical profile with respect to the desired profile and determine a relative profile data of the surface corresponding to a relation between the measured and desired profiles (with a predetermined acceptable degree of correlation between the measured and desired profiles). The relative profile indicates the distribution of variations of the measured geometrical profile with respect to a desired profile of the surface.

The data processor and analyzer utility 108 generates control data based on the relative profile data. The control data is further processed by the feedback module 112 that generates feedback data which is formatted in a predetermined manner to provide a correction map for surface being treated. The correction map is indicative, for each surface region, of whether said region is to and undergo, and to which extent, the additional material deposition process (i.e. additional coating) or is to undergo material removal process and to which extent so as to provide required coating on the surface, while maintaining/providing a predetermined desired geometrical profile of the surface.

The feedback data (or correction map) can be stored in the system memory 115 for further use for reprocessing the surface and/or transmitted to a verification storage device 114A of a process controller 114 for verifying the process previously applied to the surface. Alternatively or additionally, the correction map data is output/transmitted to the processing entity 114A, i.e. processing machine or individual executing the process.

It should be understood that the feedback module is configured for formatting the correction map data (feedback data) according to one or more predetermined formats (data presentation modes) according to the entity/entities to whom the correction map data is to be presented. In the instance that the entity is an automated machine that is carrying out the treatment process, the feedback will be formatted to commands receivable and identifiable by the automated machine for carrying out the treatment to obtain the desired profile of the coated surface. In the other instance, when the entity is a human, then the feedback may be a visual and/or audio feedback, e.g. a projector (utilizing a laser pointer or any other light emitting device) projecting on the surface visual representation of the data indicative of distribution of variations of the measured geometrical profile with respect to a desired profile of said surface. In one implementation of the system 100, the visual representation projected on the surface is color indicative. More specifically, portions of the surface that need to undergo additional material deposition process will be illuminated with a first indicative color (and preferably a plurality of shades of the specific first color in accordance with the amount of material to be deposited); portions to undergo removal of material process will be illuminated with a second indicative color (and preferably a plurality of shades of the second color in accordance with the amount of material to be removed); and portions that shall be left untreated with the originally applied coating (e.g. predetermined minimal coating thickness) will be illuminated with a third indicative color. The monitoring process of the monitoring system 100 may be repeated on a predetermined time intervals such as to indicate, to the one carrying out the surface treatment, an updated information of the surface state.

Thus, for example, 3D scanner scans the space of interest (for example a wall or a room) and passes this information (measured geometrical data) to the control unit. The data processor and analyzer of the control unit analyses the data retrieved measured data from the 3D scanner. If the user wants (if desired) the system special requirements can be entered/updated via the user interface. This may include the data about minimum filling required for the specific area/region of interest; what is the desired angle with intersecting walls, the desired level of uniformity, etc. According to the user input (or system's defaults in case no user input is provided/needed) and the measured data (image) received from the scanner, the control unit determines whether and how the treatment process is to be guided/modified (e.g. calculates the amount of filling material (e.g. plaster) required for deposition and removal for under-coated and over-coated regions of the surface being treated, in order to achieve the desired surface profile, e.g. uniformity (e.g. 1 mm).

As described above, the output (feedback data or correction map) is indicative of the topology of the wall resulting from the coating process, and may include a matrix of values each indicating the required correction with regard to the amount of filling material to be added or removed at each region (zone) of the wall.

It should also be noted and also shown in the figure in dashed lines, that the monitoring system, as well as the measurement device, may be mounted on a movable platform 111. This movable platform 111 enables the user to easily move the system to different parts of the wall, between rooms, etc. For applications like flooring, project management etc. it also enables the user to move the system as needed.

Figure 2:
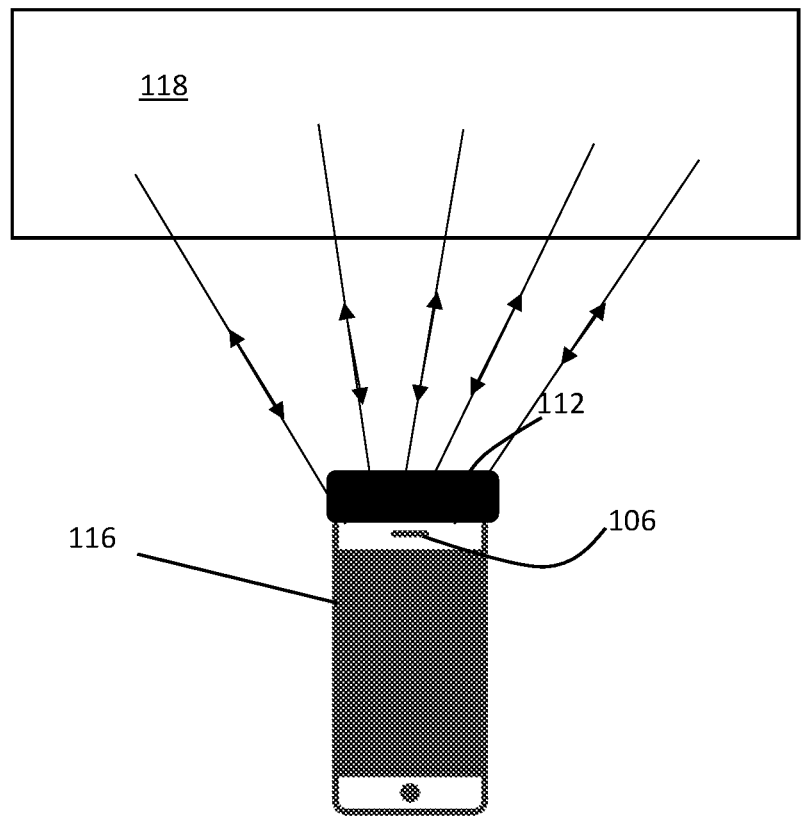
FIG. 2 schematically illustrates an example of implementing the technique of the invention using the monitoring system of FIG. 1 associated with a personal communication device, such as mobile phone device.

FIG. 2 is an exemplary illustration of a mobile phone device 116 (constituting a personal communication device) incorporating the monitoring system of the invention (100 in FIG. 1) and possible also the measurement device (106 in FIG. 1). To facilitate understanding, the same reference numbers are used to identifying functional components of the system that are common in all the examples. Indeed, mobile communication devices typically include cameras and data processors and may be installed with various software applications (e.g. by downloading such application from the network). Also, miniature projectors have been developed which may be incorporated in or attached to the personal communication device. As shown in the figure, user accommodates the personal device (mobile phone) 116 such that the surface of interest (surface under treatment) is exposed to (located in the field of view of) the camera 106 (generally, measurement device) in the device 116, and a projector (generally, feedback module) 112 is associated with the device 116 (in this non-limiting example is mounted on the device' body). The software modules of the monitoring system, i.e. user interface, control unit, memory, form the application program interface (API) installed in the device 116. The camera images the regions of the surface 118, and the correction data is projected on the wall 118 an indicative information of distribution of variations of the measured geometrical profile with respect to a desired profile of said surface.

Figure 3A:
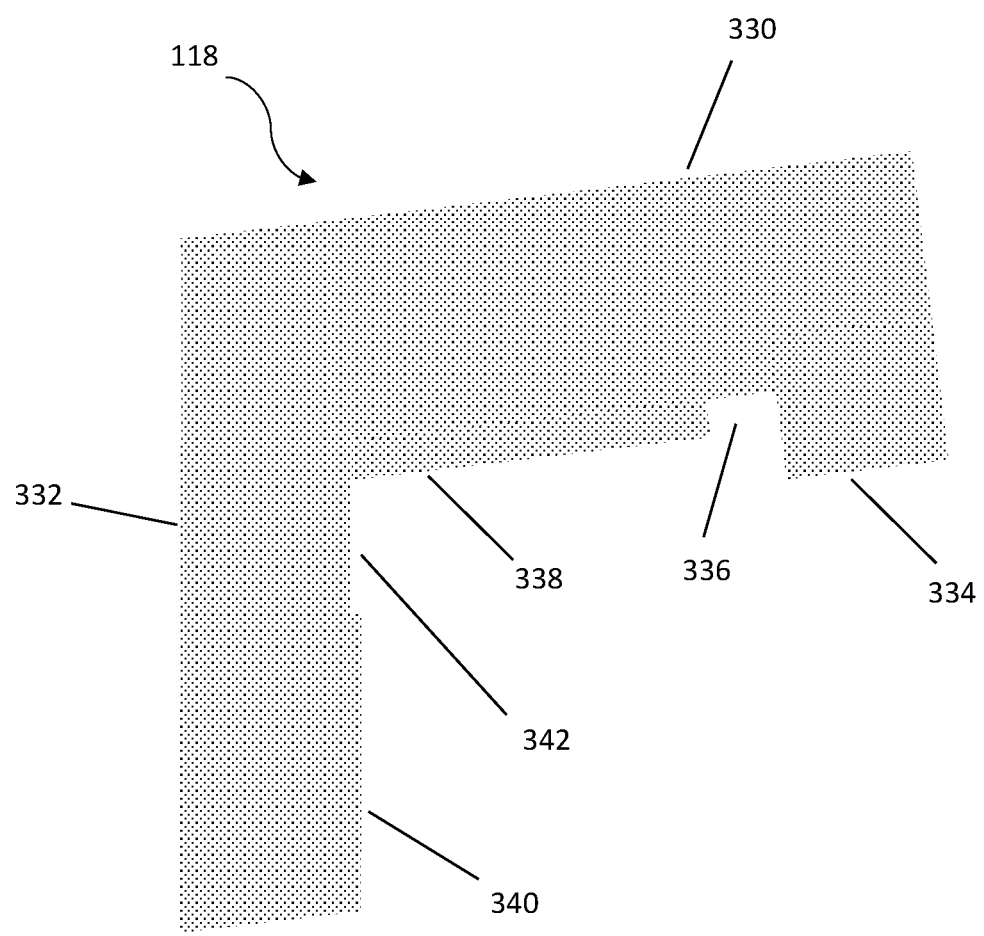
FIGS. 3A to 3C exemplify the results of the technique of the invention for controlling the plastering process to create a right angle corner between the walls, where
Figure 3B:
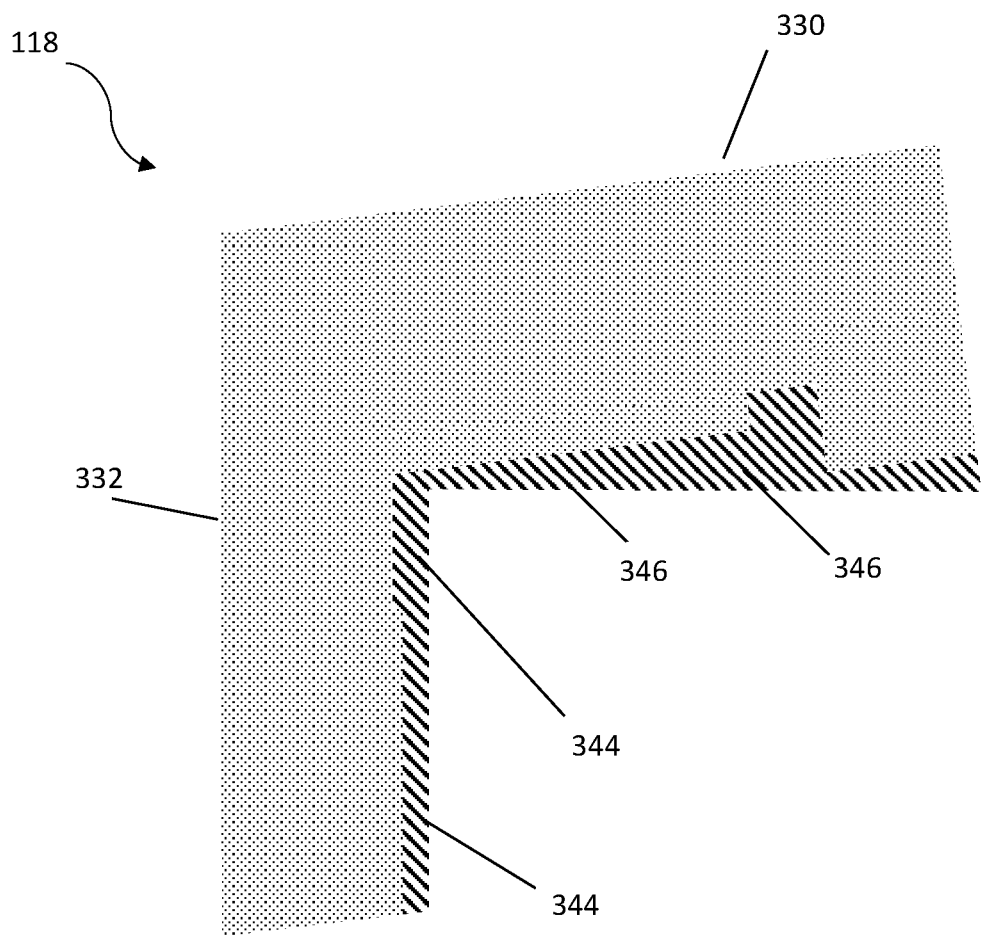
Figure 3C:
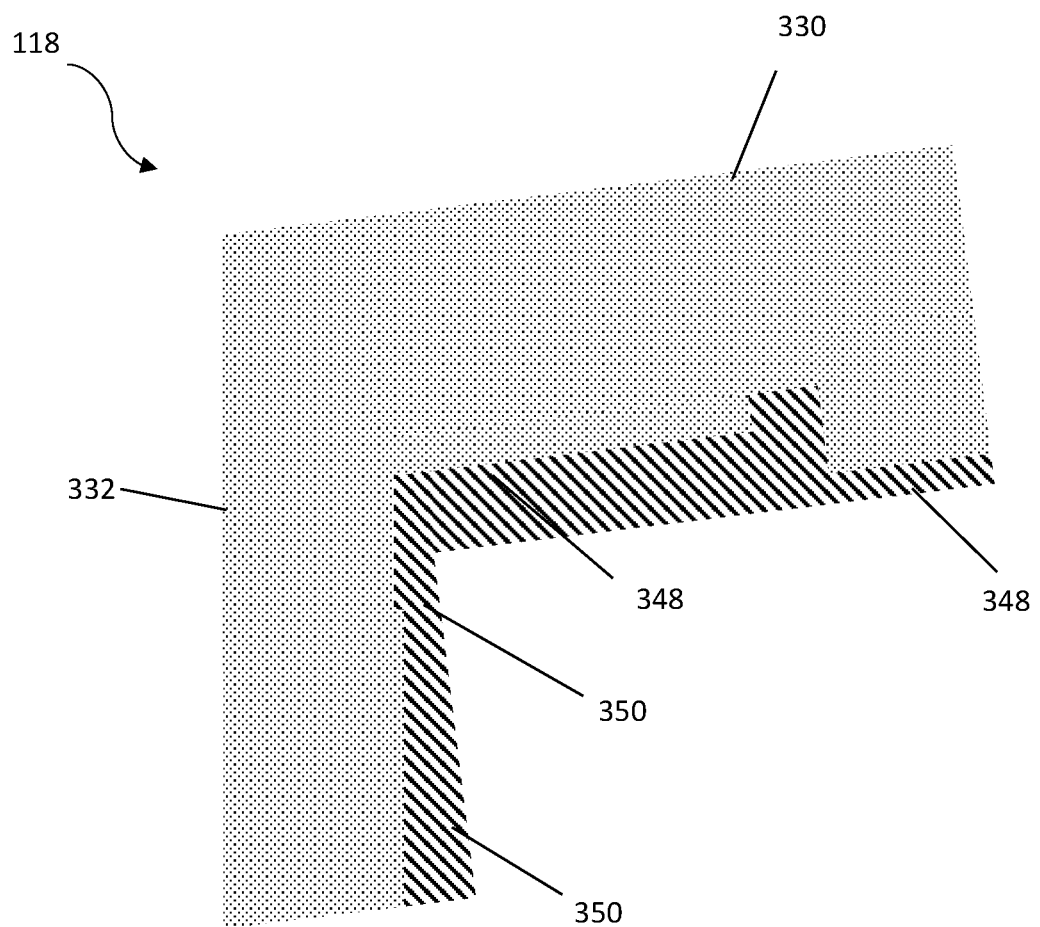

Reference is made to FIGS. 3A-3C which exemplify the results of the technique of the invention for controlling the plastering process to create a right angle corner between the walls. This example relates to a general embodiment where the desired profile corresponds to the desired angular orientation between the portions of the surface being treated. FIG. 3A illustrates the walls before they are covered/coated, FIG. 3B illustrates the walls after they are covered and 90-degrees orientation between them is achieved, and FIG. 3C illustrates the walls after they are covered and a 90-degrees orientation between them is achieved in an non-optimized manner. In this specific example, the desired profile is a right-angle orientation for two flat walls coated by certain filling material with a 1 cm minimum thickness of coating depth of 1 cm, and the goal is to execute the coating process with minimum amount of filling material (e.g. cement plaster) and maintaining the desired geometrical profile.

More specifically, FIG. 3A illustrates schematically a surface 118 formed of two intersecting portion 330, 332 (walls) that undergo material deposition. The wall 330 prior to be treated has a bump 334, a hole 336 and a smooth portion 338. Similarly, wall 332 in its pre-treated state has a bump 340 and a smooth region 342. Preferably, an initial (pre-treatment state) of the profile of the surface to be treated is provided and analyzed by the data processor and analyzer utility 108 of the present invention to generate initial feedback data indicative of the estimated minimal amount of filling required to provide the desired coating to achieve flattening of the walls and providing/maintaining the right-angular orientation.

In this specific example, the monitoring system 100 operates to select one of the walls, wall 332, to be the principal wall, and to firstly evaluate the amount of required filling and its thickness profile 344 along the wall 332 to make this wall 332 flat. Then, the system 100 utilizes data about the above-described design rules (desired geometrical pattern and minimal coating thickness) and estimates the amount of filling and its thickness profile 346 required for the other wall 330 so as to make wall 330 flat and obtain a 90 degrees angle between the two walls. This can be seen in the illustration in FIG. 3B.

FIGS. 3B and 3C illustrate a difference in the filling process parameters for the options of selecting wall 332 and wall 330, respectively, as the principle wall. As can be seen, selecting wall 330 as the principal one appears to be non-optimal as the desired geometrical profile of the walls can be achieved with higher amount of the filling material.

The technique of the present invention provides for generating treatment data (e.g. optimal treatment data) for a given initial profile of the surface prior to attending to the treatment of said surface and a given desired profile to be obtained, and present such data in the form of an initial (starting) correction map on the surface itself, such that different regions of the surface are marked/viewed differently in accordance with the amount of filling material to be coated by. To this end, a colored image projection on the surface can be used, being coded in accordance with the correction map. For example, in the projected image, the color (or color shade) per coordinate/region on the surface presents a local code according to the amount (or relative amount) of filling required for that region, e.g. red color indicates that more than 5 cm filling is required, orange-3 cm of filling is required, yellow-1 cm, green-0, and blue color indicates over-filled state for that region indicating that removal of filling is required. Then, during the filling process, the system is continuously (or periodically) carrying out the monitoring process of the present invention, and the correction map (e.g. colored projection) is successively updated giving a real time feedback to the professional.

As indicated above, in order to achieve a sufficient resolution for carrying out the process of the present invention there is no need in special tools and equipment. For example, carrying out the present invention in a room of size 3×3 meters using a camera and projector with HD properties (1920×1080) provides the resolution of 0.3 mm/pixel, an accuracy that is sufficient in the field of plastering.

Using the monitoring technique of the present invention allows a professional to cover the wall with the filling material, for example cement plaster, efficiently and without the need of using a ruler and periodic mechanical measurements by the ruler, thus significantly reducing the amount of work required to achieve the goal.

It should be noted that in another example, where the processing entity is an automated machine carrying out the addition/removal filling material process, the feedback module creates a digital file of commands to be carried out by the automated machine, namely command the machine to add or remove a certain amount of filling material from each region of the surface.

Turning back to FIGS. 3B and 3C, the monitoring system 100 of the invention can operate to optimize the amount and a deposition pattern/map of filling material required in the addition/removal of material process by taking into consideration the constraints inputted therein so as to select a principal wall so as to carry out the process using the smallest amount of material. FIG. 3C exemplifies the optimization advantage of the system 100 by illustrating the amount of material required in case the system is constrained to select wall 330 as the principal wall. It is noticeable that the amount of filling material 348, 350 is greater in this example as compared to the one presented in FIG. 3B. A comparison between them reveals that the filling material required in the non-optimized selection presented in FIG. 3C is doubled than the amount of filling material required in the optimized selection presented in FIG. 3B. When several walls of several rooms are concerned (for example entire apartment or house) the system may scan them all and decide on an optimal filling for the entire walls for achieving uniform leveled walls with minimum filling material and with the correct desired angle between them.

It should also be noted that the system of the present invention can also perform similar analysis and provide output for rounded walls. In this case, the data processor and analyzer utility can either try to find the minimal distance to the wall (presenting a minimal radius value) and provide output accordingly or a combination of radiuses, all according to predefined defaults or user input.

The system of the present invention may be used for the sole purpose of providing feedback (testing) for an already existing structure. For example, if a person wants to test the quality of the work done by the professional, the person can use the system with a feedback module that comprises a monitor.

It should also be noted that the feedback module, e.g. projector, as well as the entire system may be mounted on a gimbal (1D or 2D or 3D gimbal), for example for the cases where the FOV (field of view) of the measurement device and/or of the projector is not large enough, or for ease of use. The tripod can follow the worker automatically so the worker does not need to reposition the device when advancing the work (both horizontally and vertically).

Figure 4:
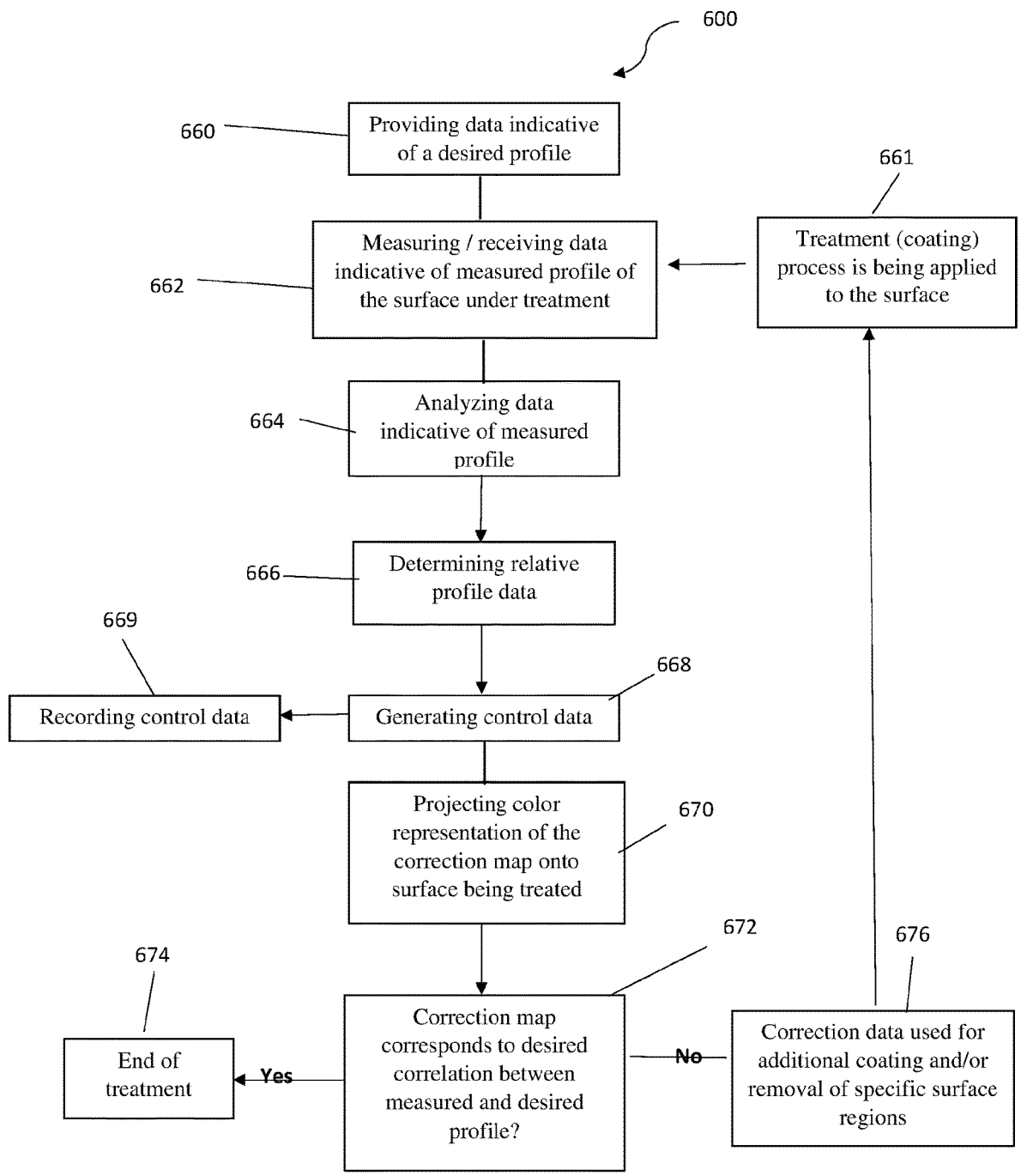
FIG. 4 illustrates a flow diagram of an example of the method of the invention for monitoring the surface treatment process using the system of FIG. 1.

FIG. 4 is a flow diagram 600 of an example of a method of the invention for monitoring and guiding/controlling a process of coating a surface with material. In the present non-limiting example, the on-line (real time) operational mode of the system is shown, i.e. the measured data is being collected during the treatment process, and correction data is provided for guiding the treatment process towards desired profile of the coated surface.

The method is carried out by first providing a data indicative of a desired profile (step 660), namely the desired geometry of the surface to be obtained in the end of the coating process. This data can comprise constraints with respect to geometrical profile (shape, surface pattern, etc.), minimal coating thickness, angles between portions of the surface, etc. As described above, although not specifically shown here, the preliminary feedback data can also be provided based on the initial surface profile (either measured or obtained from the database) and the desired one.

Then, during the surface treatment (step 661), measurements are applied to the surface, and measured data indicative of the dynamics in geometrical profile of the surface undergoing the process of coating is successively provided (step 602) by the measurement device itself or an external storage device associated therewith. The data indicative of the measured profile of the surface is analyzed (step 664) and the distribution of variations of the measured profile of the surface with respect to the desired profile (i.e. relative profile) is determined (step 666). Then, a control data indicative of the correction map for guiding the coating process is successively generated (step 668), and possibly also stored/recorded in the memory (step 669). The correction map data in the predetermined desired format/presentation form, e.g. visual representation, is provided (step 670), e.g. color coded projection (or a digital command file to a machine carrying out the coating process). The processing entity and/or the control unit of the system can verify the correction map data to determine whether the dynamically varied correction map corresponds to desired correlation between the measured and desired profile (step 672), and depending on the results either using the correction data to guide the process for additional coating and/or removal of specific surface regions (step 676) or terminating the treatment process as being complete and satisfying the design rules (step 674).

Figure 5A:
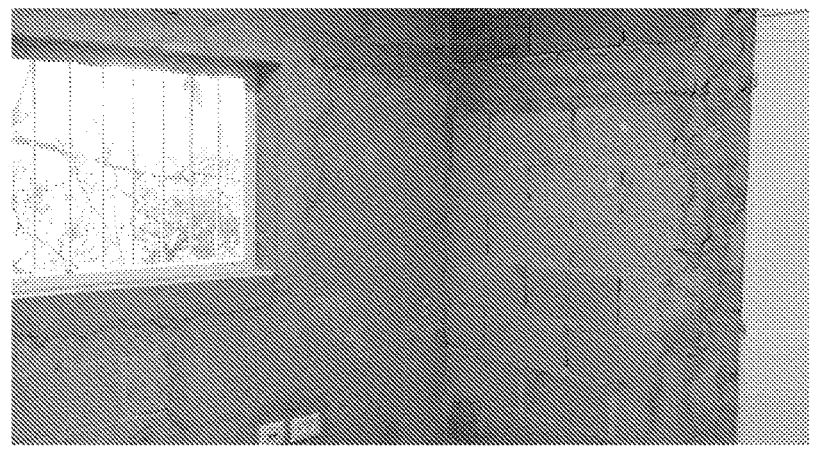
FIGS. 5A to 5I illustrate experimental results comparing the technique of the invention with the conventional plastering technique.

Reference is now made to FIGS. 5A to 5I illustrating results of the experiments conducted by the inventor to compare the results of the technique of the invention with those of the conventional plastering technique. FIG. 5A shows experimental surface in the form of two right-angle forming walls that is to undergo the plastering treatment.

Figure 5B:
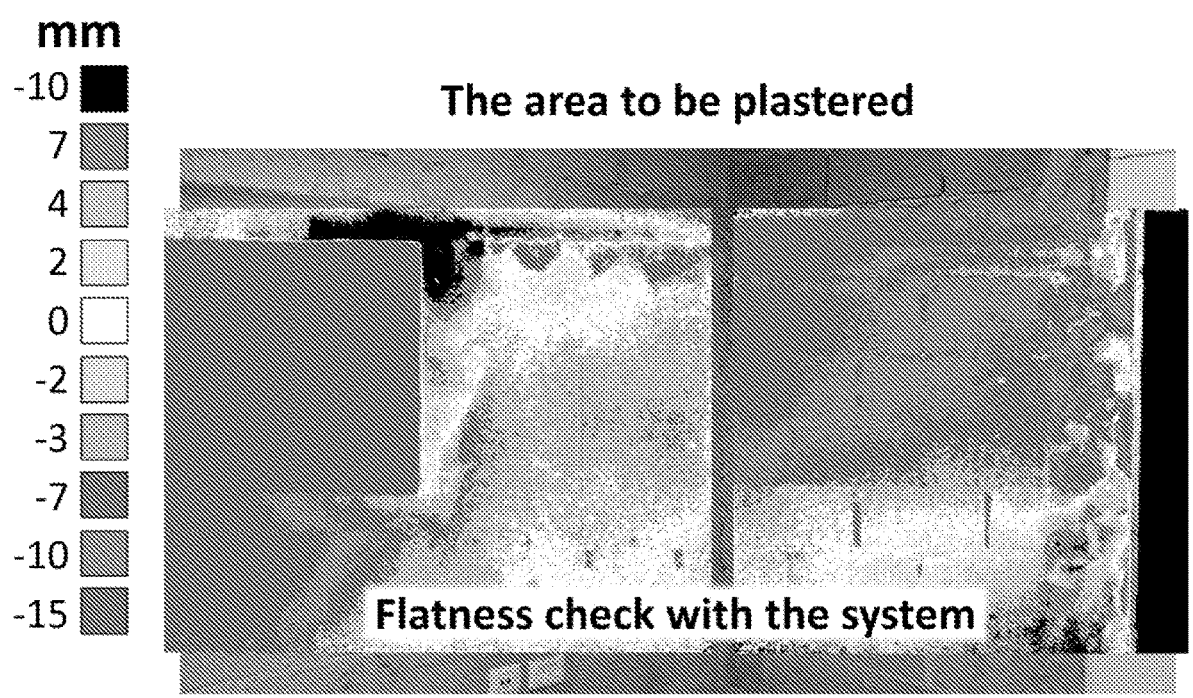

As described above, the technique of the present invention provides for generating treatment data (e.g. optimal treatment data) for a given initial profile of the surface prior to attending to the treatment of said surface and a given desired profile to be obtained, and present such data in the form of an initial (starting) correction map on the surface itself, such that different regions of the surface are marked/viewed differently in accordance with the amount of filling material to be coated by. To this end, a colored image projection on the surface can be used, being coded in accordance with the correction map. This is shown in FIG. 5B, a so-called "surface flatness check" using the monitoring system of the invention.

Figure 5C:
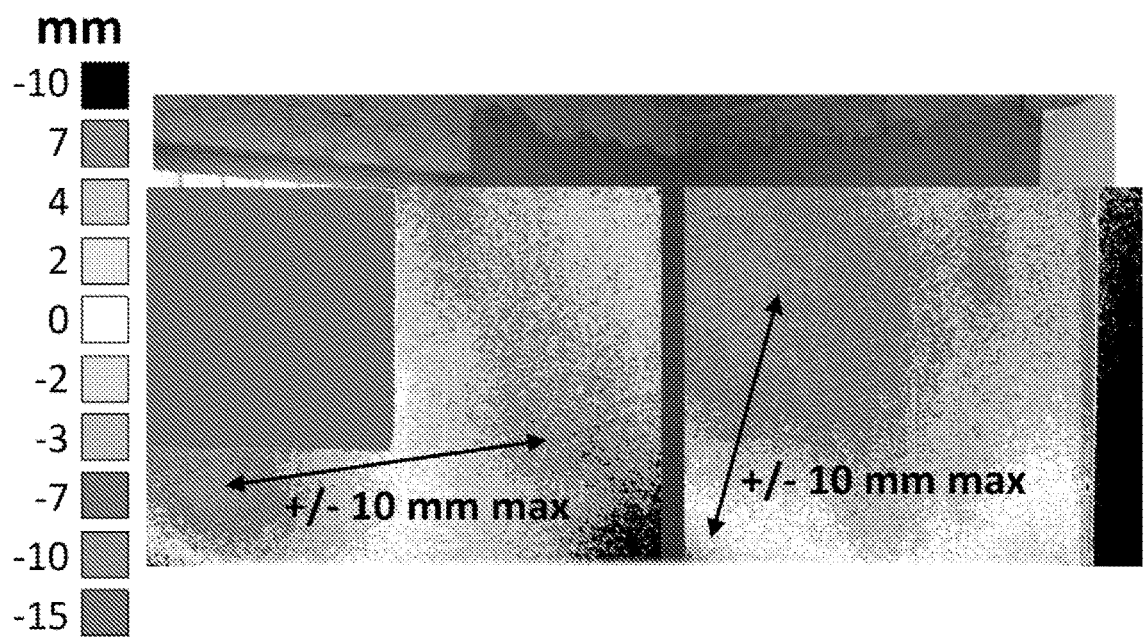
Figure 5D:
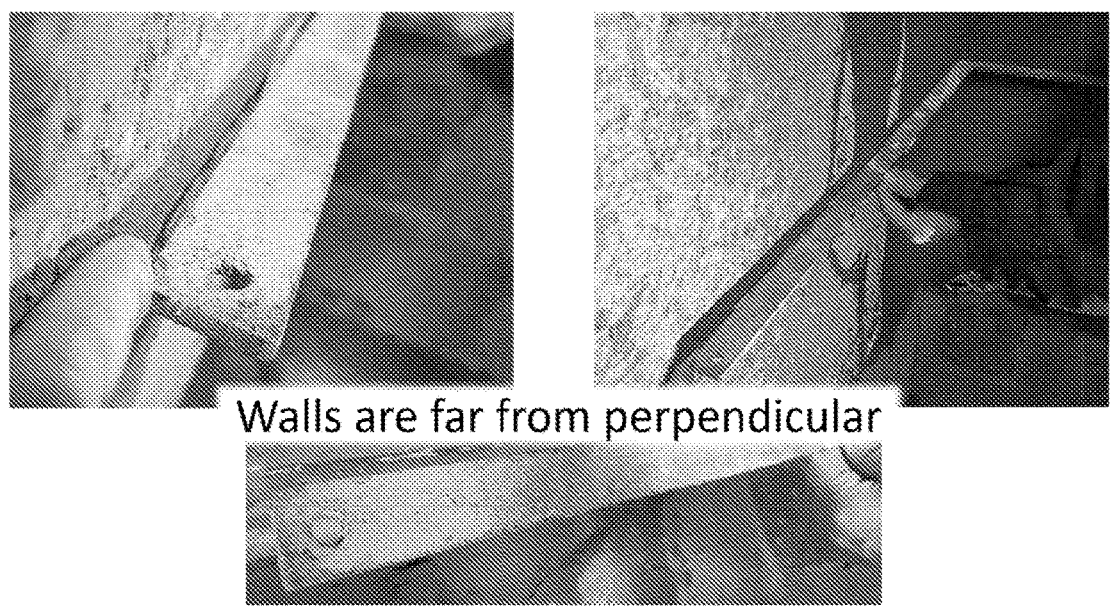

FIGS. 5C and 5D show the results of the plastering process, performed manually, in the conventional manner, i.e. sequentially performed material deposition, measurement by leveler/ruler, further deposition/removal, measurements by ruler, etc. As seen, the results show large deviations from the desired flat, perpendicular walls.

Figure 5E:
Figure 5F:
Figure 5G:
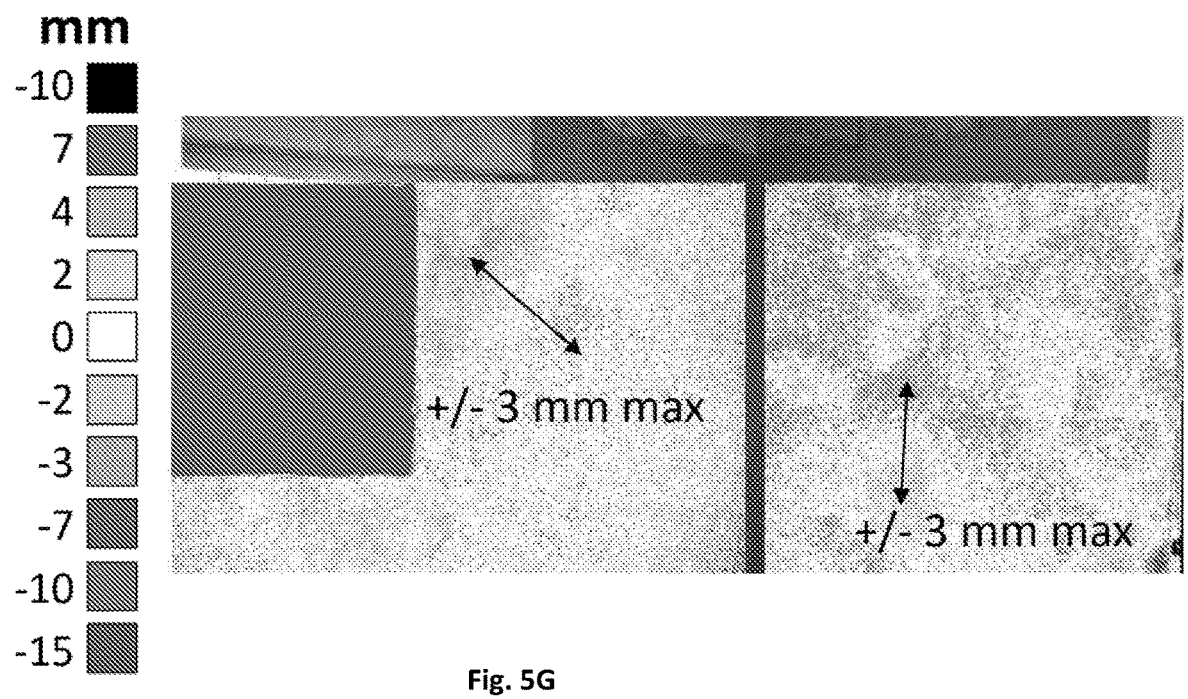
Figure 5H:
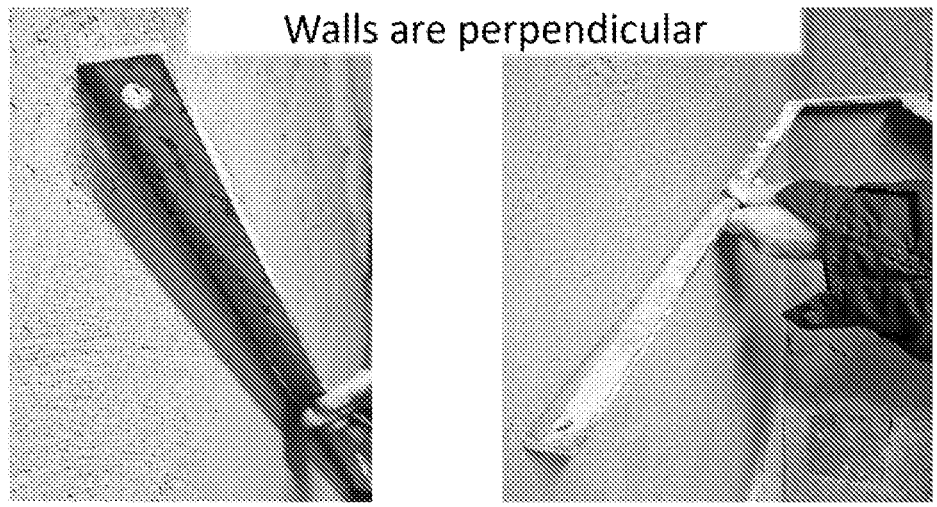
Figure 5I:
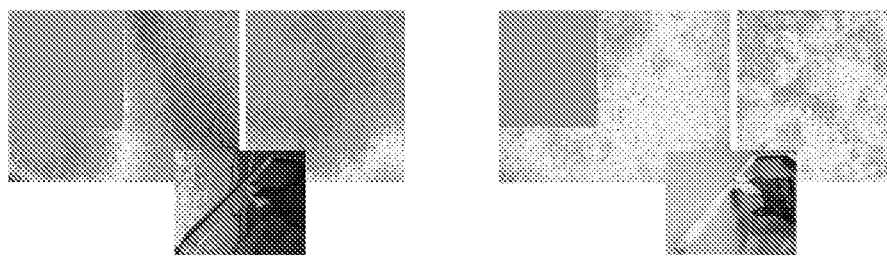

FIGS. 5E and 5F illustrate in a self-explanatory manner the manually performed plastering process assisted/controlled by the monitoring technique of the invention by determining and projecting the dynamically varying correction map data on the surface being treated, i.e. the coded (e.g. color coded) surface profile distribution. FIGS. 5G and 5H show the results of such assisted/controlled plastering process. As shown, the technique provides tiny deviations from flatness and high-degree perpendicularity of the walls. FIG. 5I summarizes the comparison results, which are evident of the advantageous features of the present invention.

Thus, the present invention provides a simple-to-implement technique for monitoring/controlling and assisting various construction-related surface treatment processes, which are performed either manually, semi-automatic or fully automatic. The invention eliminates any mechanical equipment or tools for periodically verifying the progression of the process towards the final goal.

The invention claimed is:

1. A monitoring system for real time monitoring a process of surface treatment including a material deposition process being applied to a given surface, the monitoring system comprising:
    a measurement device configured and operable for continuously or periodically applying measurements to said surface being treated and generating measured data comprising distance data corresponding to distances from the measurement device to regions of the surface undergoing said surface treatment;
    a control unit configured and operable to receive the measured data and analyze the distance data and determine a topology of said surface resulting from said surface treatment with respect to predetermined requirements of the surface treatment, and utilize determined topology of the surface to generate control data indicative thereof, the predetermined requirements of the surface treatment comprising at least one of a required thickness of the material deposited on the surface, and a required relative angular orientation of different portions of the surface; and
    a feedback module configured to receive said control data and generate feedback data in real time providing, on the surface regions of said surface being treated, visual representation of the determined topology of the surface regions of said the surface resulting from the surface treatment with respect to the predetermined requirements of the surface treatment, thereby providing a direct visual information about the surface treatment process, said direct visual information serving for guiding verification and corrections of the surface treatment process by a professional performing the surface treatment process to maintain said predetermined requirements of the determined topology of the surface while being coated by said material.

2. The monitoring system according to claim 1, wherein the measured data further comprises three-dimensional geometrical data about said surface being treated.

3. The monitoring system according to claim 1, wherein the determined topology of the surface is characterized by at least one of the following: (i) two- or three-dimensional geometrical data about the surface; (ii) a curvature of the surface; (iii) a substantially planar geometry of the surface; (iv) a relative angular orientation of at least two portions of the surface.

4. The monitoring system according to claim 3, wherein the relative angular orientation of at least two portions of the surface corresponds to right-angle geometry of the surface.

5. The monitoring system according to claim 1, wherein the feedback module comprises a projector device configured and operable for projecting on said surface an image indicative of said control data.

6. The monitoring system according to claim 5, wherein said image comprises visual representation of the distribution of variations of the measured thickness of the material being deposited with respect to the predetermined requirements of the determined topology within said surface, thereby providing a direct visual information distinguishing the surface regions that are to undergo the additional material deposition process.

7. The monitoring system according to claim 6, wherein said visual representation is a colored representation of the distribution of variations of the measured thickness of the material being deposited with respect to the predetermined requirements of the determined topology within said surface, such that the surface regions that are to undergo the additional material deposition process are identified by different colors.

8. The monitoring system according to claim 1, being configured to be installed in a personal communication device.

9. The monitoring system according to claim 1, wherein the measurement device comprises at least one of the following: at least one imager configured and operable to generate the measured data comprising the distance data; one or more measurement units configured for generating the measured data comprising the distance data by carrying out at least one of the following measurement techniques: Time Of Flight (TOF) measurements, acoustic measurements, Optical Coherence Tomography (OCT), stereoscopic measurements, and structured light 3D scanning.

10. The monitoring system according to claim 1, comprising a user interface configured for receiving user data indicative of the predetermined requirements for the determined topology of the surface.

11. The monitoring system according to claim 10, wherein the user data further comprises data indicative of a minimum thickness of a coating on the surface to be obtained as a result of said surface treatment.

12. A personal communication device comprising the monitoring system of claim 1.

13. A monitoring system for monitoring a process of surface treatment including material deposition process applied to the surface to create a coating of said material on the surface, the system comprising:
    a control unit configured as a computer system comprising data input and output utilities, memory, and data processor and analyzer, wherein:
        the data processor and analyzer utility is configured and operable to be responsive to continuously or periodically received, from a measurement device, measured data comprising distance data corresponding to distances from the measurement device to regions of the surface undergoing said treatment, and being configured and operable to analyze said measured data and determine a topology of said surface resulting from said treatment with respect to predetermined requirements of the surface treatment, and utilize said determined topology to generate control data indicative thereof, the predetermined requirements of the surface treatment comprising at least one of a required thickness of the material deposited on the surface, and a required relative angular orientation of different portions of the surface;
    a feedback module configured to receive said control data and generate feedback data in real time providing, on the surface regions of said surface being treated, visual representation of the determined topology of the surface regions of said the surface resulting from the treatment with respect to the predetermined requirements of the surface treatment, thereby providing a direct visual information about the surface treatment process, said direct visual information serving for guiding verification and corrections of the surface treatment process by a professional performing the treatment process to maintain said predetermined requirements of the determined topology of the surface while being coated by said material.

* * * * *